United States Patent [19]

Takeda et al.

[11] Patent Number: 4,863,763
[45] Date of Patent: Sep. 5, 1989

[54] PROCESS FOR PRODUCING MOLECULAR ORIENTATED FILM

[75] Inventors: Kenji Takeda; Ken Ishikawa; Tatsuo Kanetake, all of Tokyo; Takashi Kojima; Akira Itsubo, both of Ibaraki, all of Japan

[73] Assignee: Mitsubishi Petrochemical Co., Ltd., Tokyo, Japan

[21] Appl. No.: 216,349

[22] Filed: Jul. 8, 1988

[30] Foreign Application Priority Data

Jul. 13, 1987 [JP] Japan .............................. 62-175263
Oct. 12, 1987 [JP] Japan .............................. 62-257854

[51] Int. Cl.$^4$ .................. B05D 3/02; B05D 3/06; B05D 3/12
[52] U.S. Cl. ..................................... 427/355; 427/44; 427/385.5
[58] Field of Search ................. 427/44, 355, 385.5

[56] References Cited

U.S. PATENT DOCUMENTS

| | | | |
|---|---|---|---|
| 4,684,434 | 8/1987 | Thakur et al. | 427/35 X |
| 4,693,915 | 9/1987 | Matsuda et al. | 427/146 X |
| 4,698,121 | 10/1987 | Thakur et al. | 427/35 X |
| 4,783,136 | 11/1988 | Elman et al. | 427/44 X |

Primary Examiner—Michael Lusignan
Attorney, Agent, or Firm—Oblon, Spivak, McClelland, Maier & Neustadt

[57] ABSTRACT

A process for producing a polydiacetylene molecular orientated film is disclosed, which comprises a first step of forming a polydiacetylene film on a base using a diacetylene monomer or a polydiacetylene, a second step of unidirectionally rubbing the polydiacetylene film with a cloth at least once, a third step of building up a diacetylene monomer on the film, and a fourth step of polymerizing the diacetylene monomer film formed in the third step in a solid phase, said second to fourth steps being carried out once or more in this order. The resulting orientated film exhibits high orientation and crystallinity without limitations in film thickness, film area, and polymer materials.

17 Claims, 4 Drawing Sheets

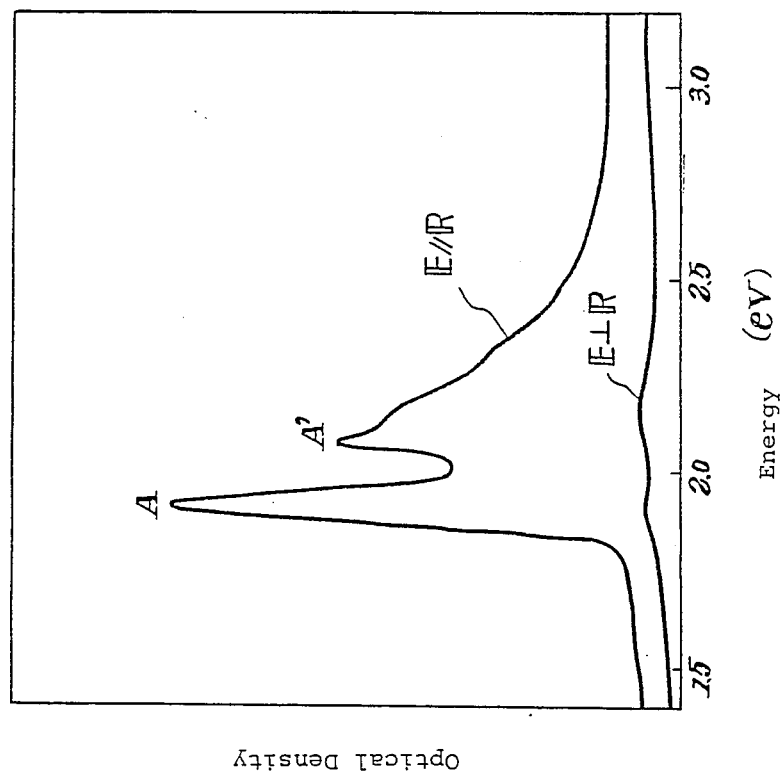

PROCESS FOR PRODUCING MOLECULAR ORIENTATED FILM

FIELD OF THE INVENTION

This invention relates to a polydiacetylene molecular orientated film useful as non-linear optical devices, chromism devices, photoelectric devices, etc. in the field of electronics and optoelectronics.

BACKGROUND OF THE INVENTION

Diacetylene compounds are known as extremely unique substances capable of forming crystalline polymers upon solid phase polymerization by heat, light, $\gamma$-rays, etc. and are expected to serve as photoelectronic materials, such as conductive materials, chromism materials, photoelectric materials, non-linear optical materials, and the like. For example, it is predicted that these compounds show a ultra-high speed switch phenomenon in the order of about $10^{-12}$ second by their non-linear optical effects and, therefore, they are promising for application to photo information processing systems.

In application to these fields, particularly the non-linear optical field, it is important to fabricate the diacetylene compound into a molecular orientated film having satisfactory crystallinity and orientation. Satisfactory crystalline films, namely molecular orientated films are also utilizable as light waveguide. Thus, possibilities of broad and various applications of the molecular orientated films are opened.

Japanese Laid-Open Patent Application No. 62608/84 discloses a process for producing a thin film of a diacetylene polymer which comprises forming a thin film of a diacetylene monomer on a base by spraying or spinning a solution or suspension of a diacetylene compound or by vacuum depositing the diacetylene compound, followed by polymerization.

However, it is generally impossible to orientate the diacetylene compound by this process. Moreover, the resulting film has very poor crystallinity, namely involves many brawbacks, such as cracks, a domain structure, a stacking disorder, and poor evenness of the plane.

In order to eliminate these drawbacks, *Macromolecules*, Vol. 18, 2341-2344 (1985) teaches that a diacetylene compound is heated to a temperature above its melting point and a shear force is applied thereto to thereby induce orientation and crystallization of the molecules. In some cases, however, the diacetylene compound undergoes thermal polymerization on elevation of temperature, resulting in incomplete shearing orientation, bringing disadvantages such as no improvement on crystallinity and orientation, etc. Besides, the resulting film is limited in thickness and area.

On the other hand, there are many reports about a film forming process including building up of a diacetylene compound having both a hydrophobic group and a hydrophilic group according to a Langmuir-Blodgett method. These processes enable us to control stacking in the thickness direction but still fail to orientate the molecules. Therefore, the resulting film is poor in crystallinity, involving disadvantages such as a domain structure, etc.

It has also been reported in *Die Makromolekulare Chemie: Rapid Communications*, Vol. 5, 77-81 (1984) that a polydiacetylene cast film formed on a transparent base is rubbed to orientate the main chain. This technique is, however, limited in material and film thickness. That is, employable materials are limited to few soluble polydiacetylenes and the process is only applicable to production of a very thin film. Further, the resulting film is not uniform and extremely inferior in orientation and crystallinity.

Hence, there has not yet been developed an excellent process for producing a molecular orientated film, by which the photoelectronic functions possessed by polydiacetylene can be made the best possible use of. Development of such a process has been a point of importance.

SUMMARY OF THE INVENTION

One object of this invention is to provide a process for producing a molecular orientated film of polydiacetylene in which molecules are highly and epitaxially orientated and crystallized by taking advantage of rigidity and straightness of the polydiacetylene molecular chain.

Another object of this invention is to provide a process for producing a molecular orientated film of polydiacetylene, which is applicable to any kind of polydiacetylene compounds irrespective of solubility or liability to thermal polymerization.

A still another object of this invention is to provide a process for producing a molecular orientated film of polydiacetylene, which permits of control of film thickness and area without any limitation.

A further object of this invention is to provide a process for producing a molecular orientated film of polydiacetylene having excellent orientation and crystallinity to the degree equal to, or even higher than, single crystals.

A still further object of this invention is to provide a process for producing a molecular orientated film of polydiacetylene fully manifesting the photoelectronic functions possessed by polydiacetylene, particularly non-linear optical effects, electro-optical effects and anisotropic photoconduction.

As a result of extensive investigations, it has now been found that a polydiacetylene molecular orientated film wherein the main chain of the polydiacetylene is orientated in a specific direction so as to have a dichroism constant (degree of orientation) of 3 or more can be produced by subjecting a diacetylene polymer film to rubbing with a silicone cloth, etc., building up a diacetylene monomer on the polymer film, and polymerizing the monomer film in a solid phase. It has also been found that a polydiacetylene molecular orientated film having a dichroism constant reaching about 30, a satisfactory degree of crystallization, and a large area can be produced by using polydiacetylene having a specific molecular structure in the abovedescribed process.

BRIEF DESCRIPTION OF THE DRAWINGS

FIGS. 1 to 4 each shows absorption spectrum of the polymer film obtained in Examples 1, 3, 4, and 5, respectively.

DETAILED DESCRIPTION OF THE INVENTION

Figure 1:
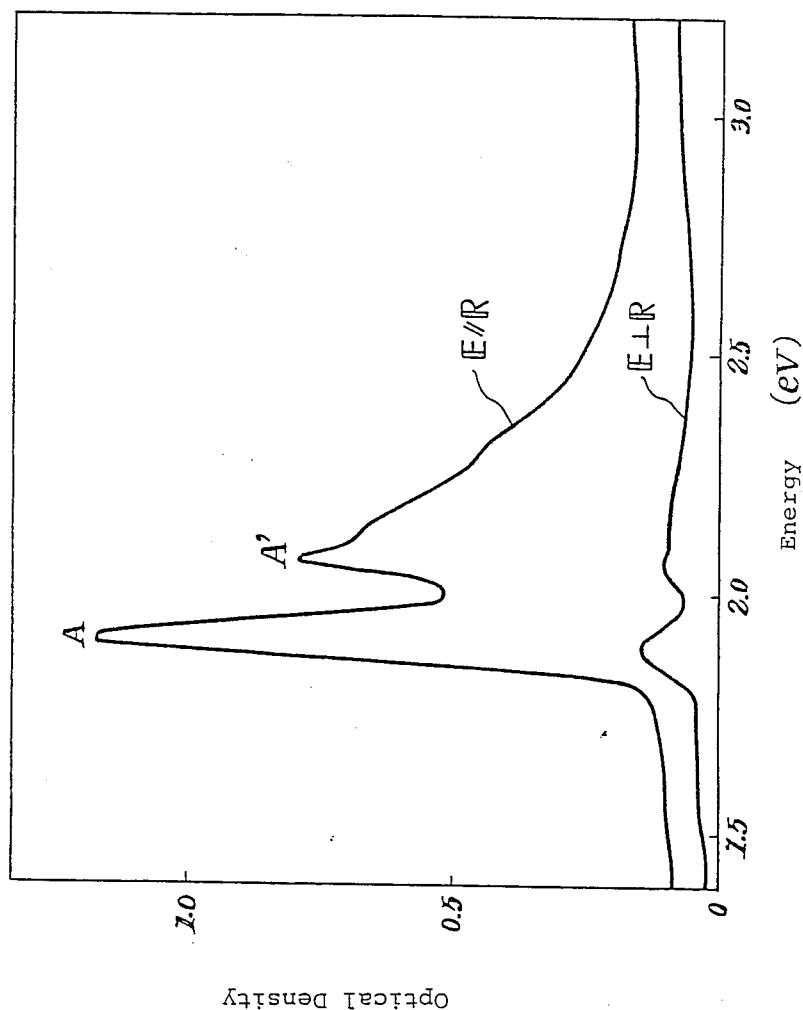

The polydiacetylene which can be used in the present invention is a polymer of a diacetylene monomer. The term "diacetylene monomer" as used herein embraces all the compounds having a conjugated diacetylene linkage —C≡C—C≡C— inclusive of various derivatives thereof and are represented by formula (I):

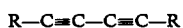 (I)

wherein R is a substituent, and the two R substituents may be the same or different.

Preferred polydiacetylenes include polymers of diacetylene monomers having, in the side chain thereof, a residue of an acid, e.g., carboxylic acids and sulfonic acid, or an ester, amide or salt thereof; a residue of an alcohol or an ester thereof with carboxylic acids, sulfonic acid, sulfinic acid, isocyanic acid, carbamic acid, etc.; a hydrocarbon group; a heterocyclic compound residue; or a phenyl group. Implicit in the above-described diacetylene monomers are:

$$CH_3(CH_2)_m-C\equiv C-C\equiv C-(CH_2)_n COOH$$

$$R_iNHCOO(CH_2)_m-C\equiv C-C\equiv C-(CH_2)_n OCONHR_j$$

wherein m and n, which may be the same or different, each represents an integer; and $R_i$ and $R_j$, which may be the same or different, each is the same substituent as R.

In the diacetylene monomers are included those of formula (I) wherein R represents $-(CH_2)_n OCONHCH_2 COOC_4H_9$ (wherein n is 3 or 4),

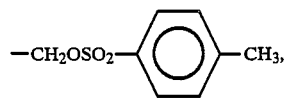

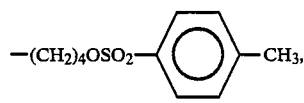

$-(CH_2)_4OCONHC_2H_5, -(CH_2)_4OCONH(CH_2)_3CH_3,$

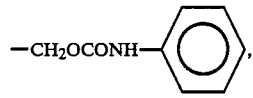

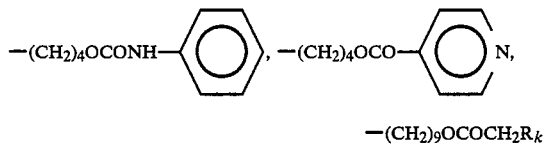

$-(CH_2)_9OCOCH_2R_k$ (wherein $R_k$ represents a phenyl group, an α-napthyl group or $-CH(CH_3)_2$),

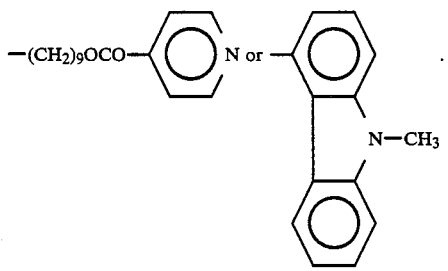

Of the diacetylene monomers to be used in the present invention particularly preferred are those of formula (I) wherein R represents an alkyl, aryl, arylsubstituted alkyl or alkyl-substituted aryl group each having a fluorine atom and up to 12 carbon atoms, e.g.,

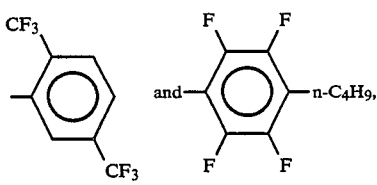

and those having an alkylurethane linkage wherein R represents a group of formula $-(CH_2)_p OCONHR^1$, wherein $R^1$ represents an alkyl, aryl, aryl-substituted alkyl or alkyl-substituted aryl group each having up to 20 carbon atoms; and p represents an integer of from 1 to 8, and especially $-(CH_2)_4OCONHC_qH_{2q+1}$, wherein q represents an integer of from 1 to 20.

In the above-described substituent, the moiety $-C_qH_{2q+1}$ is preferably a straight chain alkyl group, and q is preferably 3 or more, more preferably from 3 to 10.

The diacetylene monomers wherein R is a group of $-(CH_2)_4OCONH-C_qH_{2q+1}$ can be synthesized by starting with 5,7-dodecadiyne-1,12-diol as illustrated by the following synthesis examples.

(i) Synthesis of 5,7-Dodecadiyne-1,12-Diol-Bis(Alkylurethane) (q=1 to 11):

In 30 ml of tetrahydrofuran (THF) is dissolved 1.94 g ($1 \times 10^{-2}$ mol) of 5,7-dodecadiyne-1,12-diol and reacted with 5 ml (about double the molar quantity of 5,7-dodecadiyne-1,12-diol) of phosgen at a temperature of from 0° to 5° C. for 30 minutes to obtain 5,7-dodecadiyne-1,12-dichlorocarbonate. The reaction mixture is distilled under reduced pressure to remove THF and phosgen, and the residue is dissolved in 30 ml of THF. A solution of 4 times the molar quanity of an alkylamine in 30 ml of THF is added thereto dropwise at 15° C., followed by allowing the mixture to react for 30 minutes. The reaction mixture is rendered neutral by washing with hydrochloric acid and then extracted with a mixed solvent of water and ethyl ether. The extract is dissolved in acetone and then dried over sodium sulfate. The residue is purified by column chromatography on activated alumina using acetone as an eluent to obtain a 5,7-dodecadiyne-1,12-diol-bis(alkylurethane).

(ii) Synthesis of 5,7-Dodecadiyne-1,12-Diol-Bis-(Alkylurethane) (q=12 to 20):

5,7-Dodecadiyne-1,12-dichlorocarbonate as prepared in the same manner as described in (i) above is dissolved in 30 ml of THF. A solution of double the molar quantity of an alkylamine and double the molar quantity of triethylamine in 50 ml of THF is added dropwise to the solution at 15° C., and the mixture is allowed to react for 30 minutes. The reaction mixture is made neutral by washing with hydrochloric acid and then extracted with a mixed solvent of ethyl ether and water. The extract is dissolved in chloroform and dried over sodium sulfate. The residue is purified by column chromatography on activated alumina using chloroform as an eluent to thereby obtain 5,7-dodecadiyne-1,12-diolbis-(alkylurethane).

The above-described diacetylene monomers having an alkylurethane linkage are characterized by their film forming properties exhibited in, for example, vacuum deposition onto a base, excellent polymerizability in a solid phase as a film, and excellent orientation properties in a specific direction on rubbing of the polymerized film.

The molecular orientated film according to the present invention can be produced from the abovedescribed diacetylene monomers by following at least four steps as set forth below.

First Step:

The first step comprises forming a polydiacetylene thin film on a base.

The base to be used includes glass (e.g., quartz glass, high silica glass, borosilicate glass, soda-lime glass, Vycor glass, Pyrex glass, etc.), ceramics (e.g., alumina, steatite, forsterite, beryllia, spinel, etc.), plastics (e.g., polyethylene, an ethylene-vinyl acetate copolymer, polypropylene, polyethylene terephthalate, polytetrafluoroethylene, polyvinylidene fluoride, polyvinyl fluoride, an ethylene fluoride-vinylidene fluoride copolymer, polyvinyl chloride, polyvinylidene chloride, polyacrylonitrile, polystyrene, acetal resins, polycarbonate, polyamide, phonolic resins, melamine resins, a styrene-acrylonitrile copolymer, an acrylonitrile-butadiene-styrene copolymer, polyphenylene oxide, polysulfone, etc.), metals (e.g., pure metals, e.g., silver, aluminum, gold, beryllium, cobalt, chromium, copper, iron, iridium, magnesium, molybdenum, nickel, lead, palladium, platinum, lenium, rhodium, antimony, tin, tantalum, titanium, tungsten, zinc, zirconium, etc.; and alloys, e.g. brass, bronze, Monel metal, aluminum alloys, stainless steel, magnesium alloys, Elinvar, Inconel, etc.), single crystals (e.g., diamond, graphite, silicon, germanium, halite, potassium chloride, lithium fluoride, gallium arsenate, indium arsenate, indium antimonide, gallium phosphide, etc.), and so on.

Formation of a polydiacetylene film on the base can be carried out by either a method comprising forming a film of diacetylene monomer on a base and then polymerizing the monomer or a method comprising directly filming polydiacetylene on a base. Any of the abovedescribed diacetylene monomers is employable in the first step, but it is preferable to use the diacetylene monomers of formula (I) wherein R is a substituent containing a fluorine atom or a substituent containing an alkylurethane linkage.

In the former method, the diacetylene monomer film can be formed by dry processes, such as vacuum evaporation deposition by resistive heating, hot walling or a laser beam, deposition by a molecular beam, an ionic beam or an ionic cluster beam, sputtering, ion plating, and the like; or wet processes, such as dipping, spraying, spinning, casting, etc. using a solution or suspension of a diacetylene monomer.

Polymerization of the thus formed diacetylene monomer film can be effected by irradiation with ultraviolet rays; X-rays, $\gamma$-rays, etc., or application of heat or pressure.

In the latter method, a polydiacetylene film can be produced by wet processes, such as dipping, spraying, spinning, casting, and the like using a solution or suspension of a polydiacetylene. In using a polydiacetylene solution, a suitable solvent to be used is chloroform or 2-methyltetrahydrofuran in the case of starting with a diacetylene monomer of formula (I) wherein R is $-(CH_2)_4OCONHCH_2COOC_4H_9$ (hereinafter referred to as 4BCMU), or 1,2-dichloroethane, chloroform or dimethylformamide in the case of starting with a diacetylene monomer of formula (I) wherein R is $-(CH_2)_3OCONHCH_2COOC_4H_9$ (hereinafter referred to as 3BCMU).

In order to obtain a polydiacetylene molecular orientated film having higher orientation it is preferred that the first step is carried out by a method comprising forming a film of diacetylene monomer on a base by a dry process and then polymerizing the monomer.

The film of polydiacetylene thus formed on a base has a thickness of from 20 Å to 5000 Å, preferably from 50 Å to 3000 Å.

Second Step:

In the second step, the thus formed polydiacetylene film is subjected to unidirectional rubbing once or more, generally 3 to some hundreds of times, preferably 5 to 200 times, and more preferably 10 to 100 times. The rubbing can be effected by abrading the surface of the film in one direction with a cloth made of silicone fibers, Teflon fibers, cotton fibers, etc., preferably silicone fibers (i.e., silicone cloth). The unidirectional rubbing is preferably conducted in one way, i.g., unreciprocatedly.

Third Step:

In the third step, a diacetylene monomer is built up on the polydiacetylene film having been subjected to rubbing treatment. The building up can be carried out by depositing a diacetylene monomer on the polydiacetylene film according to the dry processes as described in the first step.

The diacetylene monomer to be used here may be the same or different to that used in the first step, but it is preferable to use a diacetylene monomer of formula (I) wherein R has an alkylurethane linkage in the first step and to use a diacetylene monomer having a substituent containing a fluorine atom in the third step.

The thickness of the build-up formed in the third step ranges from 20 Å to 50 $\mu$m, preferably from 100 Å to 5 $\mu$m.

Fourth Step:

In the fourth step, the build-up (diacetylene monomer layer) formed in the third step is subjected to solid phase polymerization. The polymerization can be carried out in the same manner as described in the first step.

The process of the present invention comprises the above-described first step and at least one combination of the second to fourth steps in the order described to obtain a molecular orientated film of a polydiacetylene. That is, after the formation of a polydiacetylene film on a base, the process including rubbing with silicone cloth, etc., building up of a diacetylene monomer and polymerization may be performed once or more, to orientate the polydiacetylene main chain in a specific direction.

The final thickness of the film thus obtained is in the range of from 50 Å to 800 $\mu$m, preferably from 100 Å to 500 $\mu$m.

The feature of the present invention lies in the rubbing of a polydiacetylene layer followed by formation of a polydiacetylene layer thereon. After the rubbing treatment, the polydiacetylene itself serves as an orientating agent, and the diacetylene monomer built up thereon is epitaxially grown and polymerized to thereby provide a film of high crystallinity in which the main chain of the polymer is orientated in a specific direction. Further, such high orientation and crystallinity can be assured over a wide area of several tens of centimeters or even more. In the resulting film, the main chain of the polydiacetylene is uniformly orientated in the same direction as the rubbing direction parallel to the base. Furthermore, the present invention makes it possible to control the film thickness by building up the polydiacetylene layer while retaining orientation and crystallinity.

In the present invention, it is possible to incorporate an unpolymerized diacetylene monomer or a dopant, e.g., a photosensitizer, a dye, etc., into the polydiacetylene molecular orientated film by simultaneous deposition or independent building-up.

The molecular orientation of the film according to the present invention can be evaluated by a dichroism constant as defined below.

A dichroism constant Rd is a ratio of the optical density in the absorption axis to that in the transmission axis as defined by equation:

$$Rd = \log(1/\tau_a)/\log(1/\tau_t)$$

wherein $\tau_a$ represents a transmission in the absorption axis; and $\tau_t$ represents a transmission in the transmission axis.

The terminology "absorption axis" means a direction of orientation of the polydiacetylene main chain which corresponds to the direction of rubbing parallel to a base. The terminology "transmission axis" means a direction perpendicular to the absorption axis, i.e., a direction perpendicular to the rubbing direction and parallel to a base.

For measurement of transmissions, linear polarized light is passed through the film at a right angle. The transmission in the absorption axis $\tau_a$ is determined with the polarizing direction agreeing with the absorption axis, and the transmission in the transmission axis $\tau_t$ is determined with the polarizing direction agreeing with the transmission axis.

The polydiacetylene molecular orientated film according to the present invention has two characteristic absorption peaks in its absorption spectrum in the visible light region. More specifically, blue polydiacetylenes called acetylene type have absorption peaks in the vicinity of 1.9 eV and 2.1 eV, which are based on the $\pi-\pi^*$ exciton of the polydiacetylene main chain and its phonon side band, respectively; and red polydiacetylenes called butatriene type have absorptions in the vicinity of 2.3 eV and 2.5 eV based on the $\pi-\pi^*$ exciton and its phonon side band, respectively.

In the present invention, the dichroism constant Rd can be calculated from the absorption axial transmission $\tau_a$ and the transmission axial transmission $\tau_t$ both determined at the absorption peak due to the $\pi-\pi^*$ exciton in the vicinity of 1.9 eV as for the acetylene type, or in the vicinity of 2.3 eV as for the butatriene type.

The polydiacetylene molecular orientated film in accordance with the present invention exhibits a dichroism constant of not less than 3, preferably not less than 5, more preferably not less than 10, and most preferably not less than 20.

The present invention is now illustrated in greater detail by way of the following Examples, but it should be understood that the present invention is not deemed to be limited thereto.

EXAMPLE 1

A 4BCMU monomer was vacuum deposited on a cleaned glass base to form a diacetylene monomer film having a thickness of 500 Å. The film was irradiated with ultraviolet rays emitted from an ultra-high pressure mercury lamp (200 W) to effect solid phase polymerization to thereby obtain a 4BCMU polymer film.

The surface of the resulting polymer film was repeatedly rubbed with a silicone cloth unidirectionally and also in one way. Then, a 4BCMU monomer was built up thereon by vacuum evaporation to a thickness of 5000 Å, and the build-up was polymerized in a solid phase by ultraviolet rays emitted from an ultra-high pressure mercury lamp to obtain a 4BCMU polymer film having a total thickness of 5400 Å and an area of 40 cm².

The linear polarized light absorption spectrum of the resulting polymer film is shown in FIG. 1. In the FIG., IE indicates the polarizing direction of the linear polarized light, and IR indicates the direction of the rubbing. Therefore, IE ‖ IR means that linear polarized light whose polarizing direction is parallel to the rubbing direction is vertically incident upon the film, and IE⊥IR means that linear polarized light whose polarizing direction is perpendicular to the rubbing direction is vertically incident upon the film.

The FIG. revealed agreement between the orientation direction of the 4BCMU polymer main chain and the rubbing direction. Seeing that this polarized absorption characteristic had no positional dependence in the film, it Was confirmed that the main chains were orientated in the same direction over the entire area of the film. It can be seen that the absorption peaks (A, A') in the vicinity of 1.9 eV and 2.1 eV, which are due to the $\pi-\pi^*$ exciton of the 4BCMU polymer main chain and its phonon side band, respectively, were very close to each other and well distinguishable, indicating high crystallinity. In addition, the dichroism constant at the absorption peak in the vicinity of 1.9 eV due to the $\pi-\pi^*$ exciton was found to be 6.5.

EXAMPLE 2

An orientated 4BCMU polymer film was produced in the same manner as described in Example 1, except that the resulting polymer film was further subjected to the same rubbing treatment as performed previously and a 4BCMU monomer was built up thereon followed by solid phase polymerization by ultraviolet rays in the same manner as performed previously. The second rubbing was carried out in the same direction as the first rubbing. The built-up of the 4BCMU monomer had a thickness of 5000 Å. The resulting polymer film had an area of 40 cm² and a total thickness of 1.0 μm.

Similarly to Example 1, the absorption spectrum using linear polarized light revealed agreement between the orientation direction of the main chain and the rubbing direction. Since the polarized absorption characteristic was not dependent on position of the film, it was confirmed that the main chains were orientated in the same direction over the entire area of the film. The dichroism constant at the absorption peak in the vicinity of 1.9 eV due to the $\pi-\pi^*$ exciton was found to be 7.2.

COMPARATIVE EXAMPLE 1

A 4BCMU monomer was vacuum deposited onto a glass base to form a 4BCMU monomer film having a thickness of 1.0 μm, which was then irradiated with ultraviolet rays to polymerize in a solid phase to obtain a 4BCMU polymer film. The polymer film was subjected to rubbing in the same manner as in Example 1. The resulting polymer film had a thickness of 1.0 μm.

As a result of the absorption spectrum of the film using linear polarized light, the dichroism constant at the absorption peak in the vicinity of 1.9 eV due to the $\pi-\pi^*$ exciton was found to be up to 2, proving that the polymer film has a low degree of orientation, though equal to the film of Example 2 in thickness.

EXAMPLE 3

A diacetylene monomer represented by formula:

$$CH_3(CH_2)_{11}-C\equiv C-C\equiv C-(CH_2)_8COOH$$

[hereinafter referred to as (12,8)] was used.

In the same manner as in Example 1, the (12,8) monomer was vacuum deposited onto a glass base to form a (12,8) monomer film of 600 Å in thickness, and the film was solid phase polymerized by irradiating ultraviolet rays to obtain a (12,8) polymer film. In the same manner as in Example 1, the polymer film was rubbed with a silicone cloth, and a (12,8) monomer was then built up thereon by vacuum evaporation to a thickness of 6000 Å, followed by solid phase polymerization by ultraviolet rays to obtain a (12,8) polymer film having an area of 40 cm² and a thickness of 6500 Å.

Figure 2:
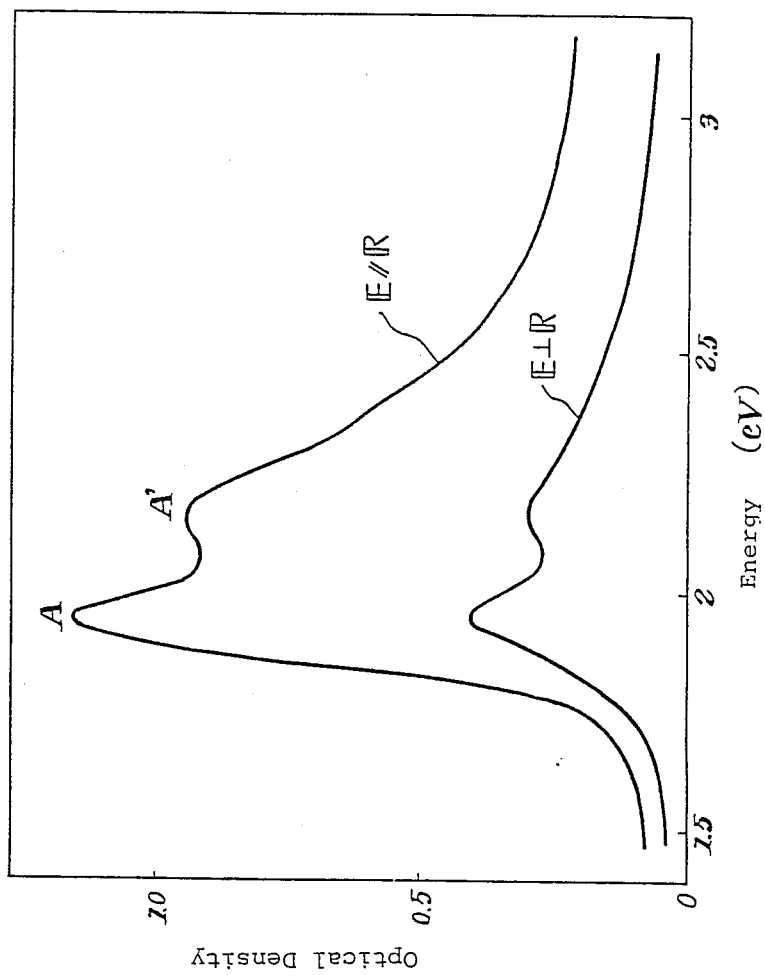

The linear polarized light absorption spectrum of the (12,8) polymer film is shown in FIG. 2. and
in FIG. 2 have the same meanings as in FIG. 1. From the FIG. it can be seen that the orientation direction of the main chain was consistent with the rubbing direction. From the fact that the polarized absorption characteristic was not dependent on position of the film, it can be seen that the main chains were orientated in the same direction over the entire area of the film. The absorption peaks (A, A') in the vicinity of 1.9 eV and 2.2 eV, respectively, which are due to the $\pi-\pi^*$ exciton and its phonon side band, were close to each other and well distinguishable from each other, indicating high crystallinity. Further, the dichroism constant at the absorption peak in the vicinity of 1.9 eV was found to be 3.

EXAMPLE 4

(a) Synthesis of Diacetylene Monomer:
5,7-Dodecadiyne-1,12-diol-bis(n-butylurethane) represented by formula:

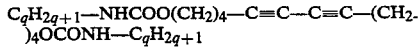

Wherein q is 4, was synthesized in accordance with the process described before.
Melting Point: 125.5°–126.0° C.
Elementary Analysis for $C_{22}H_{36}N_2O_4$:
Calcd. (%): C 67.34; H 9.18; N 7.14;
Found (%): C 67.54; H 9.07; N 7.20.
Infrared Spectrum (KBr): 3300 cm$^{-1}$ (N—H stretching), 2920 cm$^{-1}$ and 2850 cm$^{-1}$ (C—H stretching, 1680 cm$^{-1}$ (C=O ), 1530 cm$^{-1}$ (N—H deformation), and 1260 cm$^{-1}$ (C—O—C stretching)

b) Film Formation:
The above prepared monomer was deposited on a cleaned glass base by vacuum evaporation to form a 500 Å thick monomer film. The monomer film was solid phase polymerized by irradiating ultraviolet rays emitted from an ultra-high pressure mercury lamp (200 W) to obtain a polymer film.

The surface of the resulting polymer film was repeatedly rubbed with a silicone cloth unidirectionally in one way. Thereafter, the same monomer was built up thereon by vacuum evaporation to a thickness of 4500 Å and subjected to solid phase polymerization in the same manner as above to obtain a polymer film having an area of 36 cm² and a total thickness of 4800 Å.

Figure 3:
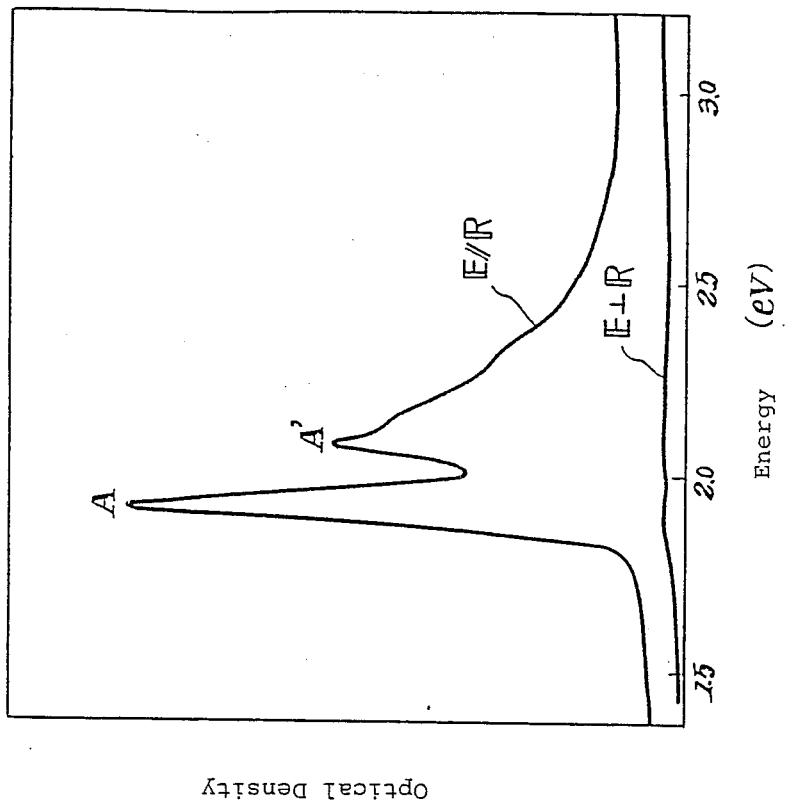

The absorption spectrum of the resulting polymer film using linear polarized light is shown in FIG. 3. IE and IR in the FIG. have the same meanings as in FIG. 1. From the FIG. it can be seen that the orientation direction of the polymer main chain was consistent with the rubbing direction. From the fact that the polarized absorption characteristic was not dependent on position of the film, it can be seen that the main chains were orientated in the same direction over the entire area of the film. The absorption peaks (A, A') in the vicinity of 1.9 eV and 2.1 eV, respectively, which are due to the $\pi-\pi^*$ exciton and its phonon side band, respectively, were close to each other and well distinguishable, indicating high crystallinity of the film. Further, the dichroism constant at the absorption peak in the vicinity of 1.9 eV due to the $\pi-\pi^*$ exciton was 30.5.

EXAMPLE 5 a) Synthesis of Diacetylene Monomer:
5,7-Dodecadiyne-1,12-diol-bis(n-heptylurethane) having the same formula as described in Example 4 wherein q is 7 was synthesized in accordance with the process described before.
Melting Point: 112.0°–112.5° C.
Elementary Analysis for $C_{28}H_{48}N_2O_4$:
Calcd. (%) C 70.58; H 10.08; N 5.88;
Found (%) C 70.64; H 10.18; N 5.63.
Infrared Spectrum: the same as in Example 4.

(b) Film Formation:
The above synthesized monomer was deposited on a cleaned glass base by vacuum evaporation to form a monomer film having a thickness of 500 Å. The monomer film was solid phase polymerized by ultraviolet rays emitted from an ultra-high pressure mercury lamp (200 W) to obtain a polymer film.

The polymer film was repeatedly rubbed with a silicone cloth unidirectionally in one way, and the same monomer was then built up thereon to a thickness of 5000 Å by vacuum evaporation. The built-up was polymerized in a solid phase by ultraviolet rays emitted from an ultra-high pressure mercury lamp to obtain a polymer film having an area of 40 cm² and a total thickness of 5400 Å.

The absorption spectrum of the resulting polymer film using linear polarized light is shown in FIG. 4. It can be seen from FIG. 4 that the orientation direction of the polymer main chain agreed with the rubbing direction. From the fact that the polarized absorption characteristic was not dependent on position of the film, it can be seen that the main chains were orientated in the same direction over the entire area of the film. The absorption peaks (A, A') in the vicinity of 1.9 eV and 2.1 eV, respectively, which are due to the $\pi-\pi^*$ exciton and its phonon side band, respectively, were close to each other and well distinguishable, indicating high crystallinity of the film. Further, the dichroism constant at the absorption peak in the vicinity of 1.9 eV due to the $\pi-\pi^*$ exciton was found to be 25.8.

EXAMPLE 6

(a) Synthesis of Diacetylene Monomer:
5,7-Dodecadiyne-1,12-diol-bis(n-pentadecylurethane) having the same formula as described in Example 4 wherein q is 15 was synthesized in accordance with the process described before.
Melting Point: 115.0°–115.5° C.

Elementary Analysis for $C_{44}H_{80}N_2O_4$: CalCd. (%) C 75.42; H 11.42; N 4.00; Found (%) C 75.62; H 11.33; N 4.05.

Infrared Spectrum: the same as in Example 4.

(b) Film Formation:

The above synthesized monomer was deposited on a cleaned glass base by vacuum evaporation to form a monomer film having a thickness of 600 Å. The monomer film was solid phase polymerized by ultraviolet rays emitted from an ultra-high pressure mercury lamp (200 W) to obtain a polymer film.

The polymer film was repeatedly rubbed with a silicone cloth unidirectionally in one way, and the same monomer was built up thereon to a thickness of 6500 Å by vacuum evaporation. The built-up was polymerized in a solid phase by ultraviolet rays emitted from an ultra-high pressure mercury lamp to obtain a polymer film having an area of 40 cm² and a total thickness of 7000 Å.

The linear polarized light absorption spectrum of the resulting polymer film proved of agreement between the orientation direction of the polymer main chain and the rubbing direction. From the fact that the polarized absorption characteristic was not dependent on position of the film, it can be seen that the main chains were orientated in the same direction over the entire area of the film. The absorption peaks in the vicinity of 1.9 eV and 2.1 eV, respectively, which are due to the $\pi-\pi^*$ exciton and its phonon side band, respectively, were close to each other and well distinguishable, indicating high crystallinity of the film. Further, the dichroism constant at the absorption peak in the vicinity of 1.9 eV due to the $\pi-\pi^*$ exciton was found to be 15.0.

While the invention has been described in detail and with reference to specific embodiments thereof, it will be apparent to one skilled in the art that various changes and modifications can be made therein without departing from the spirit and scope thereof.

What is claimed is:

1. A process for producing a polydiacetylene molecular orientated film which comprises a first step of forming a polydiacetylene film on a base using a diacetylene monomer or a polydiacetylene, a second step of unidirectionally rubbing the polydiacetylene film with a cloth at least once, a third step of building up a diacetylene monomer on the film, and a fourth step of polymerizing the diacetylene monomer film formed in the third step in a solid phase, said second to fourth steps being carried out once or more in this order.

2. A process as claimed in claim 1, wherein said diacetylene monomer to be used in the first and/or third step is represented by formula:

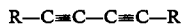

wherein R represents an alkyl, aryl, aryl-substituted alkyl or alkyl-substituted aryl group each containing a fluorine atom and up to 12 carbon atoms.

3. A process as claimed in claim 1, wherein said diacetylene monomer to be used in the first and/or third step is represented by formula:

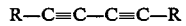

wherein R is

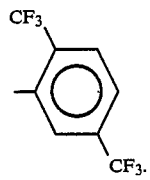

4. A process as claimed in claim 1, wherein said diacetylene monomer to be used in the first and/or third step is represented by formula:

wherein R is

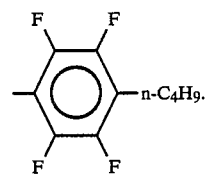

5. A process as claimed in claim 1, wherein said diacetylene monomer to be used in the first and/or third step is represented by formula:

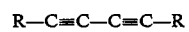

wherein R is $-(CH_2)_pOCONHR^1$, wherein $R^1$ represents an alkyl, aryl, aryl-substituted alkyl or alkyl substituted aryl group each having up to 20 carbon atoms; and p represents an integer of from 1 to 8.

6. A process as claimed in claim 5, wherein said diacetylene monomer to be used in the first and/or third step is represented by formula:

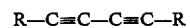

wherein R is $-(CH_2)_4OCONH-n-C_qH_{2q+1}$, wherein q represents an integer of from 1 to 20.

7. A process as claimed in claim 1, wherein said first step comprises forming a film of diacetylene monomer on a base by a dry process and then polymerizing the monomer.

8. A process as claimed in claim 1, wherein thickness of from 20 to 5000 Å.

9. A process as claimed in claim 1, wherein said rubbing in the second step is carried out in one way 3 or more times.

10. A process as claimed in claim 1, wherein said diacetylene monomer to be used in the first step and that to be used in the third step are the same.

11. A process as claimed in claim 1, wherein said diacetylene to be used in the first step and that to be used in the third step are different.

12. A process as claimed in claim 11, wherein said diacetylene to be used in the first step is represented by formula:

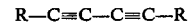

wherein R is $-(CH_2)_pOCONHR^1$, wherein $R^1$ represents an alkyl, aryl, aryl-substituted alkyl or alkyl-substituted aryl group each having up to 20 carbon atoms; and p represents an integer of from 1 to 8, and said diacetylene monomer to be used in the third step is represented by formula:

$$R-C\equiv C-C\equiv C-R$$

wherein R represents an alkyl, aryl, aryl-substituted alkyl or alkyl-substituted aryl group each containing a fluorine atom and up to 12 carbon atoms.

13. A process as claimed in claim 1, wherein said diacetylene monomer build up in the third step has a thickness of from 20 Å to 50 μm.

14. A process as claimed in claim 1, wherein said polydiacetylene molecular orientated film has a thickness of from 100 Å to 500 μm.

15. A process as claimed in claim 1, wherein said polydiacetylene molecular orientated film has a dichroism constant of 5 or more.

16. A process as claimed in claim 1, wherein said polydiacetylene molecular orientated film has a dichroism constant of 10 or more.

17. A process as claimed in claim 1, wherein said polydiacetylene molecular orientated film has a dichroism constant of 20 or more.

* * * * *